(12) United States Patent
Young et al.

(10) Patent No.: US 7,445,169 B2
(45) Date of Patent: Nov. 4, 2008

(54) PRODUCT DISPENSING CAP WITH PIVOTAL DIRECTIONAL SPOUT

(75) Inventors: Christopher J. Young, Port Washington, NY (US); Brooks R. Markert, Harwinton, CT (US); Dio C. Cavero, Port Washington, NY (US); Stuart Leslie, Larchmont, NY (US); Justin Waldinger, Long Island City, NY (US)

(73) Assignees: C & N Packaging, Inc., Wyandanch, NY (US); Lebanon Seaboard Corporation, Lebanon, PA (US)

( * ) Notice: Subject to any disclaimer, the term of this patent is extended or adjusted under 35 U.S.C. 154(b) by 345 days.

(21) Appl. No.: 11/082,571

(22) Filed: Mar. 17, 2005

(65) Prior Publication Data

US 2006/0208009 A1   Sep. 21, 2006

(51) Int. Cl.
*A01C 3/06* (2006.01)
*B67D 3/00* (2006.01)

(52) U.S. Cl. .................. 239/657; 222/532; 222/547; 239/664

(58) Field of Classification Search .......... 222/654, 222/664, 663, 531, 532, 533–537, 547, 565, 222/555, 564, 556; 239/657, 663, 664, 654; 220/711, 713, 717, 254.3, 254.4
See application file for complete search history.

(56) References Cited

U.S. PATENT DOCUMENTS

| 1,274,969 | A | 8/1918 | Wirt | |
|---|---|---|---|---|
| 2,102,118 | A | 12/1937 | Heatlie | 221/62 |
| 2,123,643 | A | 7/1938 | Wilson | 221/62 |
| 2,111,482 | A | 8/1938 | Ruetz | 221/60 |
| 2,139,085 | A | 12/1938 | Lawson | 221/60 |
| 2,492,846 | A | 12/1949 | Coyle et al. | 222/559 |
| 2,511,560 | A | 6/1950 | Bechmann | |
| 2,665,038 | A | 1/1954 | Fowler | 222/561 |
| 2,808,186 | A | 10/1957 | Kates | 222/561 |
| 3,174,661 | A | 3/1965 | Speicher | 222/545 |
| 3,223,297 | A | 12/1965 | Nyden | 222/485 |
| 3,502,248 | A * | 3/1970 | Libit et al. | 222/534 |
| 3,659,758 | A | 5/1972 | Waterman | 222/561 |
| 3,718,238 | A * | 2/1973 | Hazard et al. | 222/536 |
| 4,057,167 | A | 11/1977 | Lee | 220/90.4 |
| 4,773,568 | A | 9/1988 | Schaefer | 222/175 |
| 4,925,067 | A | 5/1990 | Zemlo et al. | 222/480 |

(Continued)

FOREIGN PATENT DOCUMENTS

GB   2112761   7/1983

*Primary Examiner*—Kevin P Shaver
*Assistant Examiner*—Stephanie E Tyler
(74) *Attorney, Agent, or Firm*—Gerald T. Bodner

(57) ABSTRACT

A cap dispenses material from a container having a mouth. The cap has a main body mountable on the mouth. The main body includes a protruding portion having an opening for receiving material moving through the mouth. A combination seal and dispensing spout is pivotally mounted to the main body and has a top wall with an extended portion. The spout may be pivoted on the main body between a sealing position and a dispensing position. In the sealing position, the spout blocks flow of material through the opening. In the dispensing position, the spout is aligned with the opening in the protruding portion to allow material to flow through the protruding portion and onto the spout so that the material may be dispensed.

10 Claims, 7 Drawing Sheets

U.S. PATENT DOCUMENTS

| | | | |
|---|---|---|---|
| 4,998,674 A | 3/1991 | Torra | 239/652 |
| 5,054,634 A | 10/1991 | Margotteau | 215/322 |
| 5,086,941 A | 2/1992 | English et al. | 220/254 |
| 5,193,722 A | 3/1993 | Groya et al. | 221/531 |
| 5,390,828 A | 2/1995 | Gross | 222/211 |
| 5,697,533 A | 12/1997 | Shahbazian | 222/480 |
| D397,035 S | 8/1998 | Young et al. | D9/449 |
| 5,853,115 A * | 12/1998 | Turbett et al. | 222/531 |
| 5,873,478 A * | 2/1999 | Sullivan et al. | 215/389 |
| 5,890,628 A * | 4/1999 | Simpson et al. | 222/131 |
| 5,938,062 A | 8/1999 | Paramski | 220/254 |
| 6,068,153 A | 5/2000 | Young et al. | 220/254 |
| 6,439,442 B1 | 8/2002 | Markert et al. | 222/547 |

\* cited by examiner

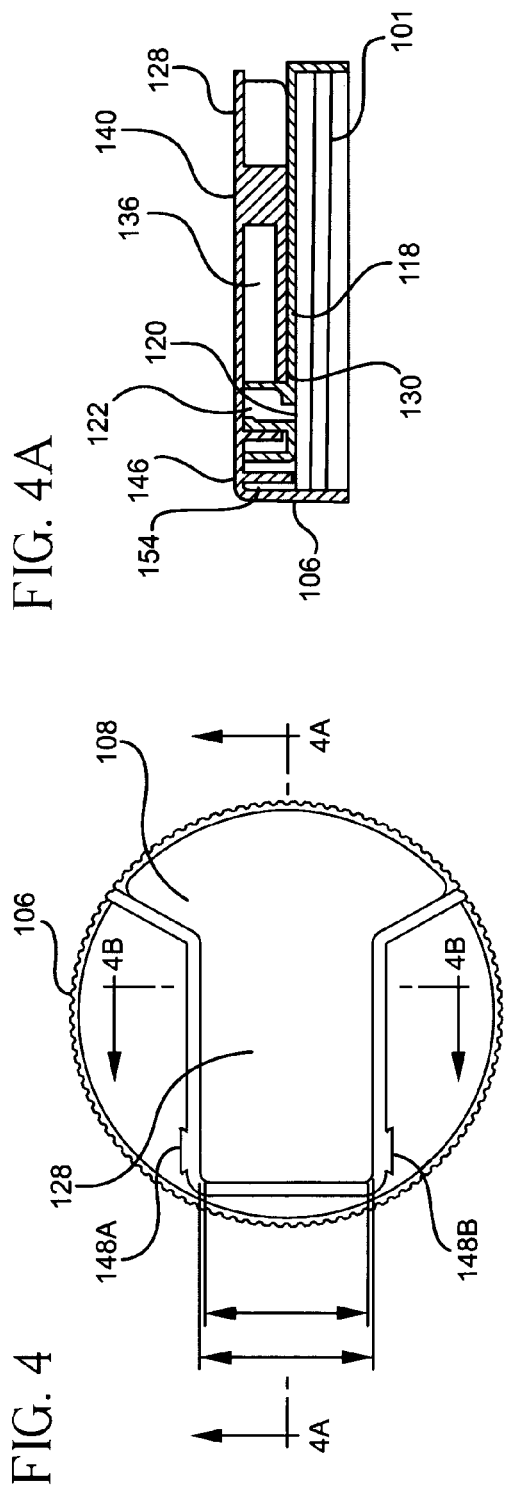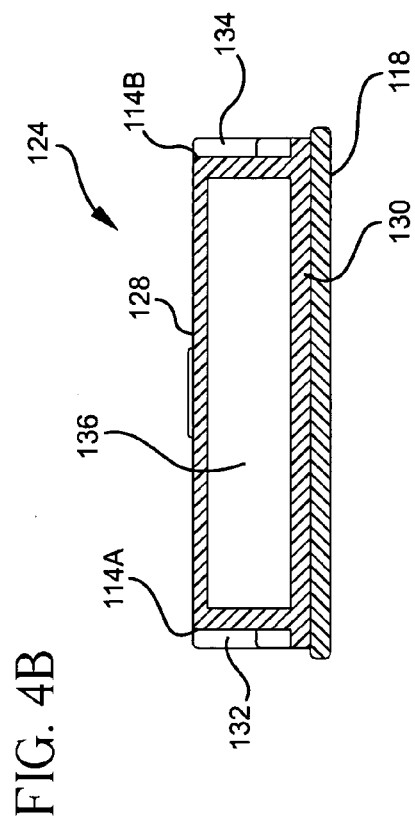
FIG. 4
FIG. 4A
FIG. 4B

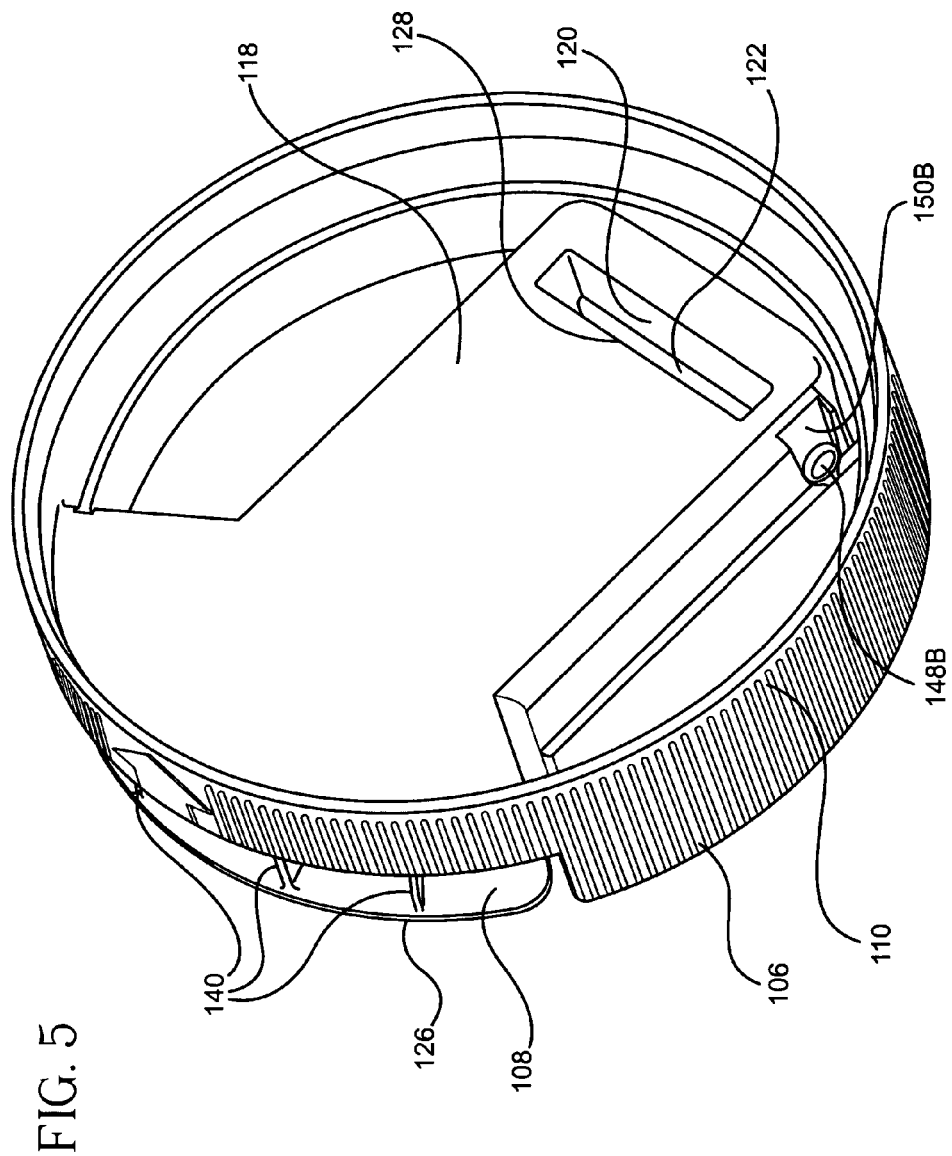

PRODUCT DISPENSING CAP WITH PIVOTAL DIRECTIONAL SPOUT

BACKGROUND OF THE INVENTION

The present invention relates generally to the field of containers and lids for dispensing fluidized material.

DESCRIPTION OF THE PRIOR ART

A variety of containers and lids have been devised for spreading fluidized material, such as grass seed, fertilizer, food products and various granular and powdered material. For example, U.S. Pat. No. 1,274,969 discloses a broadcast sower for distributing seed from a container in a plurality of different directions. U.S. Pat. No. 2,511,560 discloses a scoop for manually scattering powdered or granular materials such as lime, fertilizer, or seeds with the scoop provided with a plurality of vanes to direct the material outwardly from the scoop. Another seed spreader that inertially ejects the seed from the hopper is disclosed in U.S. Pat. No. 4,773,568. A simpler approach is disclosed in U.S. Pat. No. 4,998,674 that includes a telescopic nozzle to uniformly distribute granular material. U.S. Pat. No. 5,938,062 discloses a container lid having an aperture closable by a slidable wall mounted to the lid of the container.

Despite the prior spreaders and distributors, there is still a need for a sturdy container lid that is easy to operate for distributing granular material simultaneously in a variety of different radial directions. It is desirable for such a lid be resealable to allow for repeated distributions. One such lid having a slidable spout is disclosed in U.S. Pat. No. 6,439,442.

The aforementioned U.S. Pat. No. 6,439,442 works well in distributing seed, fertilizer or other granular material. One drawback, however, with the lid disclosed therein is that the container on which the lid is affixed and which holds the granular material to be distributed must be held in an upside down position and grasped from its bottom in order for the lid to function. The lid spout slidably extends from a retracted position on the lid, and the granular material pours from the container through the spout for spreading while the container is held upside down.

Users may feel it awkward to hold the container in such a position, and a filled container may be heavy and tiresome to grasp and hold upside down. Furthermore, provision must be made in the bottom of the container to allow the user to grasp and firmly hold the container from its bottom. Such provision may diminish valuable container volume, and further may offset the stability of the container while it rests on its bottom when not in use.

OBJECTS AND SUMMARY OF THE INVENTION

It is an object of the present invention to provide a new and improved cap for dispensing fluidized material from a container.

It is another object of the present invention is to provide a resealable cap for radially distributing granular material in a variety of directions.

It is a further object of the present invention to provide a dispensing cap with a pivotal spout which requires the container on which it is mounted to be turned only from a vertical to a horizontal position for the cap to function to distribute the contents of the container.

It is still another object of the present invention to provide a dispensing cap which overcomes the disadvantages of known dispensing caps and lids.

The present invention is directed to a dispensing cap for dispensing material from a container having a mouth. The cap comprises a main body mountable on the mouth of the container. The main body includes a protruding portion having a passageway for receiving and passing therethrough material flowing through the mouth, with the protruding portion having a plurality of sides. The protruding portion is disposed on the main body such that a space is formed adjacent one side of the plurality of sides of the protruding portion. The dispensing cap also includes a combination seal and dispensing spout pivotally mounted to the main body, with the spout having a top wall and an extended portion joined to the top wall, and two side walls coupled to the top wall. The spout is pivotal between a sealing position such that the spout substantially prevents flow of material through the passageway and a dispensing position such that material can be dispensed by flowing through the mouth and the passageway and onto the spout, wherein upon the spout pivoting on the main body from the sealing position to the dispensing position, the extended portion pivots through the space and contacts at least one of the plurality of sides of the protruding portion of the main body.

The pivotal spout can further include a bottom wall disposed opposite to and in parallel with the top wall, with the bottom wall being joined to the two side walls, the top wall, the two side walls and the bottom wall being coupled to one another forming therein a tube having a proximal end with a tube entrance and a distal end with a tube exit. The distal end is enlarged relative to the proximal end, and at least one baffle extends partially radially through a portion of the distal end to enable the flow of material to be directed radially outwardly away from the tube exit.

One of the spout and the cap main body has at least one hinge pin mounted thereon and the other of the spout and the cap main body has at least one hinge support mounted thereon, the at least one hinge pin being captively received by the at least one hinge support to enable the spout and the extended portion thereof to pivot with respect to the cap main body. The cap main body can have formed therein a channel, wherein the spout when in the sealing position is disposed within the channel. The cap main body includes at least one locking tab. The at least one locking tab is positioned in the channel for selectively lockingly engaging the at least one baffle when the spout is in the sealing position.

The present invention is directed also to a spreader for spreading fluidized material, with the spreader comprising a container for holding a fluidized material and having a mouth situated at one end thereof through which material can flow, and a dispensing cap for dispensing material from the container, the dispensing cap preferably having the features described previously.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 4 is a top plan view of the dispensing cap of the present invention and shown with the spout in the closed position.

FIG. 4A is a cross-sectional view of the dispensing cap shown in FIG. 4 and taken along line 4A-4A of FIG. 4.

FIG. 4B is a cross-sectional view of a portion of the dispensing cap shown in FIG. 4 and taken along line 4B-4B of FIG. 4.

FIG. 5 is a bottom perspective view of the dispensing cap of the present invention and shown with the spout in the closed position.

DETAILED DESCRIPTION OF THE PREFERRED EMBODIMENTS

Figure 1:
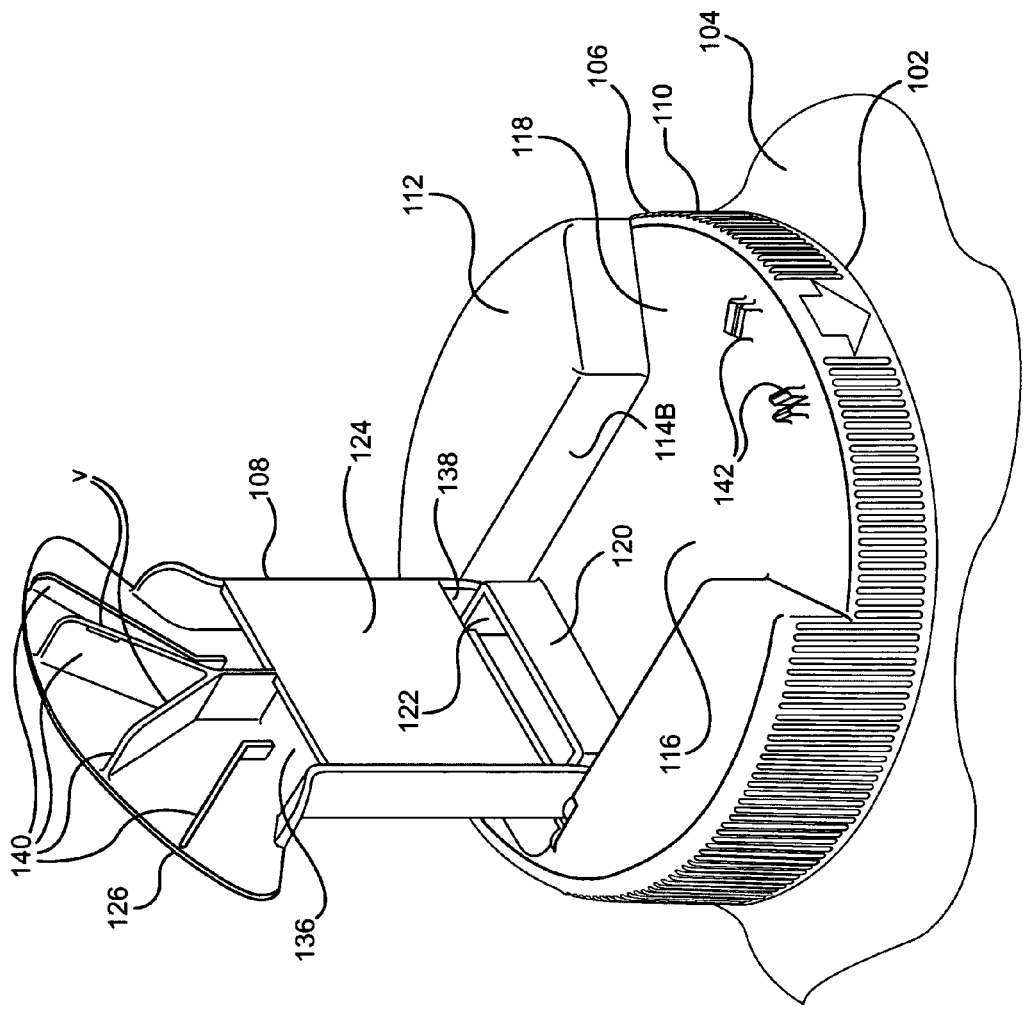
FIG. 1 is a top perspective view of a dispensing cap formed in accordance with the present invention and shown mounted on a container and with the spout in the open position.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring initially to FIG. 1, there is shown a cap 100 of the present invention for dispensing material from a mouth 102 of a container 104. Only the top portion of the container 104 is depicted in the drawings, it being understood that the main body of the container further extends from the mouth 102 as shown in FIG. 1. The interior of the container 104 can be filled with a fluidized material, such as a granular or powdered material. For example, the container can hold grass seed or fertilizer. Together the cap 100 and container 104 define a spreader which is used for spreading the fluidized contents of the container.

Figure 2A:
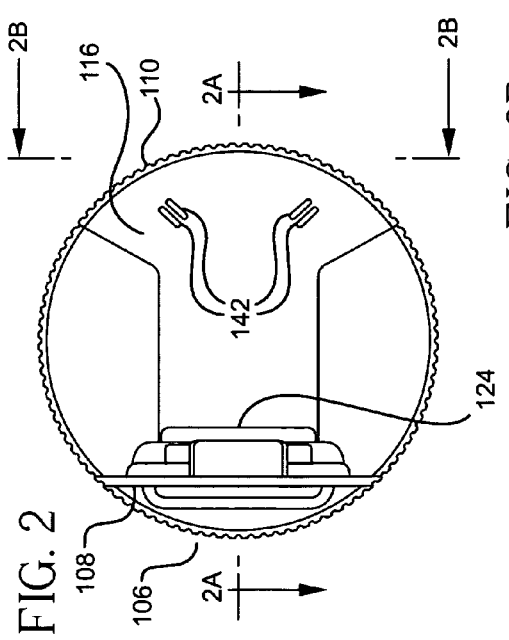
FIG. 2A is a cross-sectional view of the dispensing cap shown in FIG. 2 and taken along line 2A-2A of FIG. 2.

Cap 100 includes a main body 106 removably mountable on container mouth 102 by means of threads or similar structure. Mouth 102 can be provided with circumferentially extending and outwardly facing threads in meshing engagement with the circumferentially extending and inwardly facing threads 101 provided on main body 106, as shown in FIG. 2A. A combination seal and dispensing spout 108 is pivotally mounted to the cap main body 106 and is shown in an open or dispensing position in FIG. 1.

Figure 2:
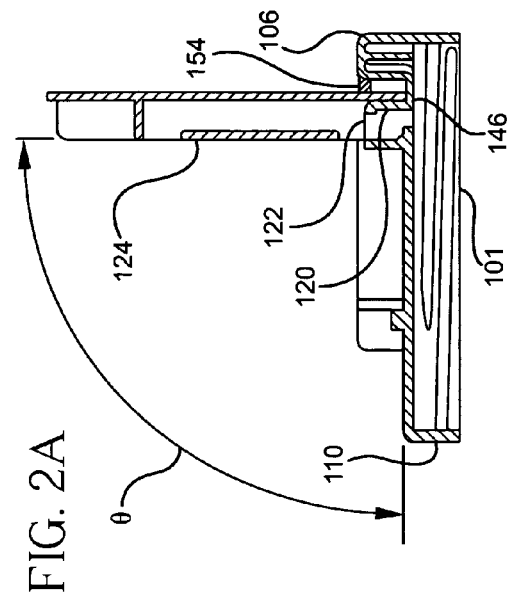
FIG. 2 is a top plan view of the dispensing cap of the present invention and shown with the spout in the open position.
Figure 2B:
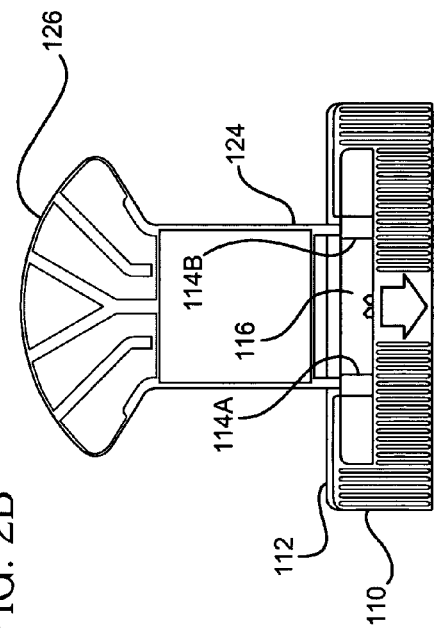
FIG. 2B is a side elevation view of the dispensing cap shown in FIG. 2 and taken along line 2B-2B of FIG. 2.

The cap main body 106 has a circumferentially extending edge portion or rim 110, preferably knurled or roughened for grasping by a user, integrally joined to a first or top wall 112, as shown in FIGS. 2, 2A and particularly in FIG. 2B. A pair of spaced apart walls 114A and 114B are integrally joined to and extend downwardly from top wall 112 forming a channel 116. Walls 114A and 114B have bottom edges integrally joined to a second or bottom wall 118 extending horizontally across the bottom of channel 116. A protruding portion 120 in bottom wall 118 forms a port or passageway 122 in direct communication with the interior of the container 104.

The combination seal and dispensing spout 108 has an elongated tubular main body 124, also referred to herein as a tube 124, having a flared distal end 126. As illustrated in FIG. 4B, tube 124 includes a first or top wall 128 integrally joined to a second or bottom wall 130 by a pair of parallel side walls 132 and 134. Walls 128, 130, 132 and 134 define a hollow passage 136 extending lengthwise through the tube 124 of combination seal and dispensing spout 108. Hollow passage 136 communicates with a tube entrance, such as opening 138, shown in FIG. 1 formed in a proximal end of tube 124, and a tube exit, such as that defined by the flared distal end 126 of tube 124.

The flared distal end 126 of tube 124 includes at least one and preferably a plurality of vanes or baffles 140 that are joined preferably at least to the top wall 128, or alternatively to the bottom wall 130. When the dispensing spout 108 is in the open or dispensing position, the hollow passage 136 is aligned with the port or passageway 122 in the protruding portion 120 of the bottom wall 118 of the cap main body 106. Therefore, there is direct communication between the hollow passage 136 and the port or passageway 122 so that any material within the container 104 can flow through mouth 102 and then through passageway 122 of cap main body 106 and onward to the hollow passage 136. Preferably, the cross-sectional area of the hollow passage 136 equals or exceeds the cross-sectional area of port 122 to facilitate proper flow of the material. Typically, the shape of the passage 136 at the proximal end of the tube 124 matches the shape of the port 122 also to facilitate proper flow of the material.

Upon reaching the vanes or baffles 140, the material flowing out of the container 104 is diverted simultaneously in a variety of different radial directions, according to the path formed by the vanes or baffles 140. Preferably, the vanes or baffles 140 are arranged so that at least one V-shaped baffle, designated as V, is formed to enable changing the direction of flow of the material in different radial directions outwardly away from the tube exit such as the flared distal end 126.

One or more upstanding pairs of resilient locking tabs 142 are disposed on the bottom wall 118 of the cap main body 106. The vanes or baffles 140 are arranged so that when the combination seal and dispensing spout 108 is in the closed position, at least a portion of the vanes or baffles 140 lockingly engages with corresponding pairs of locking tabs 142 to provide a positive seal for the container 104 by maintaining the spout 108 in a closed position within channel 116.

The dispensing cap 100 of the present invention is shown with its spout in the open position in FIGS. 2, 2A and 2B. The tube 124 is fully open for dispensing product, and is positioned with respect to the cap main body 106 to form an angle θ between the bottom wall 118 of the cap main body 106 and its bottom wall 130. Preferably, the angle θ is 90°, but the cap main body 106 and the combination seal and dispensing spout 108 may be designed to accommodate other angles as the fully open position, as desired, which are either less than or greater than 90°.

Figure 3A:
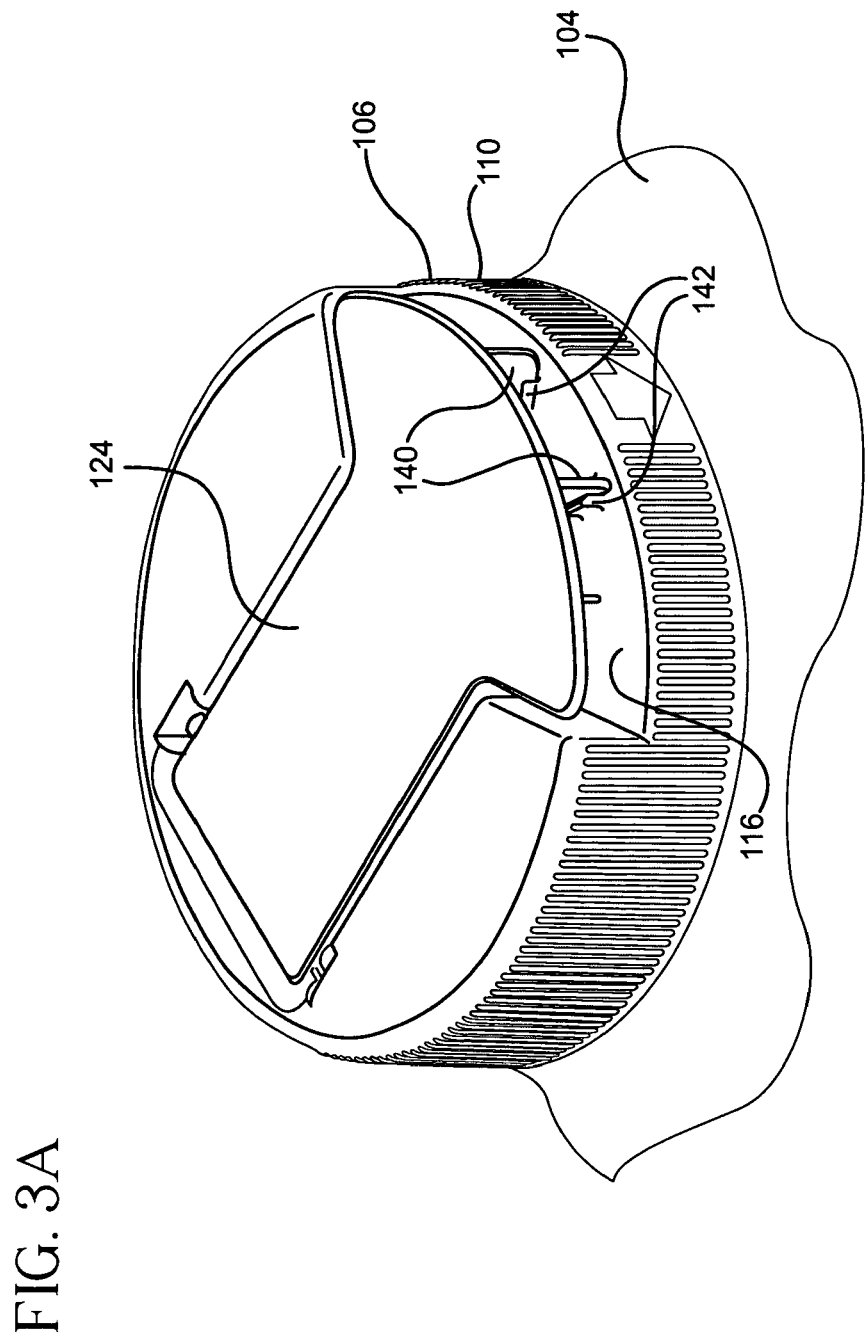
FIG. 3A is a top perspective view of the dispensing cap of the present invention and shown mounted on a container and with the spout in the closed position.

FIG. 3A illustrates the dispensing cap 100 with the spout 108 in the closed position. In particular, the tube 124 is disposed in the channel 116 so that the vanes or baffles 140 lockingly engage with the locking tabs 142 to maintain the spout 108 in the closed position. Also, in this position, the inside surface of the top wall 128 of the spout rests against, and thus seals, the exposed free end of protruding portion 120 of the cap main body 106 so that material contained within the interior of container 104 is inhibited from exiting the container 104 through protruding portion 120. Also as can be seen from FIG. 3A, the top wall 128 of the spout 108 and the top wall 112 of the cap main body 106 are aligned with each other and reside in the same plane when the spout 108 is in the closed position.

Figure 3B:
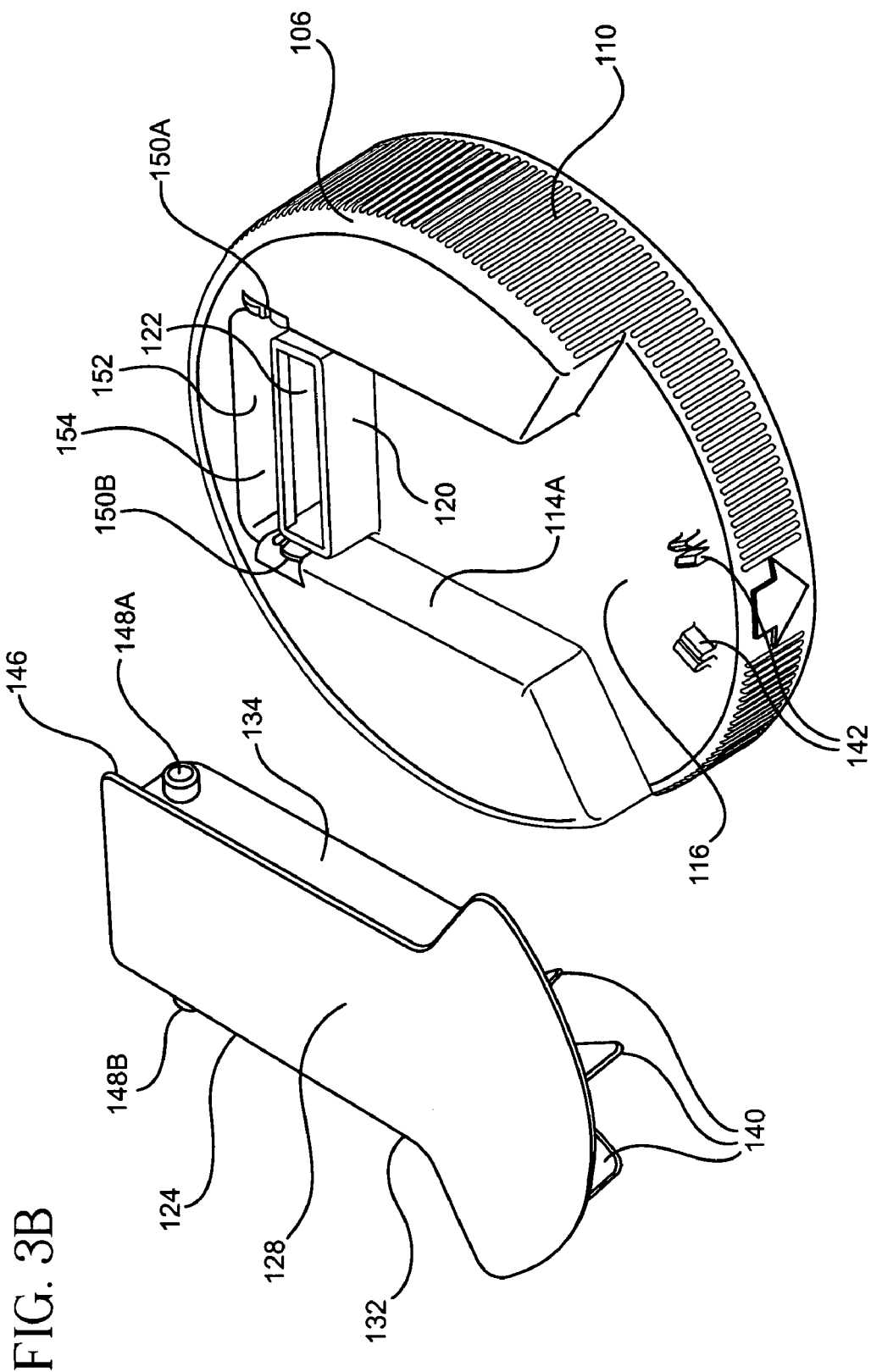
FIG. 3B is an exploded perspective view of the dispensing cap of the present invention.

FIG. 3B illustrates in greater detail the cap main body 106 and the spout 108. In particular, the top wall 128 of the spout has an extended portion 146 at the proximal end of the tube 124. The tube 124, and therefore the combination seal and dispensing spout 108, is pivotally coupled to the cap main body 106 by pivotal means such as at least one hinge pin and preferably two hinge pins 148A and 148B extending outwardly from side walls 132 and 134 of the tube 124. More specifically, hinge pin 148A is disposed on the side wall 134 of tube 124 near the proximal end of the tube 124, and similarly, hinge pin 148B is disposed on the side wall 132 of tube 124 also near its proximal end. The hinge pins 148A and 148B are captively received by resilient hinge supports 150A and 150B, respectively, which are disposed in the walls 114A and 114B of the cap main body 106 at a position proximal to the protruding portion 120 of the cap main body 106. The cap main body 106 comprises a back wall 152 defining a closed end of channel 116 and which is integrally coupled to each of the side walls 114A and 114B and proximate to the protruding portion 120. The back wall 152 and the protruding portion 120 together form a space 154 for receiving the extended portion 146 of top wall 128 when the spout 108 is pivoted to its open position. Of course, those skilled in the art recognize that the positions of the hinge pins 148A and 148B and hinge supports 150A and 150B may be reversed to still permit the spout 108 to pivot on the cap main body 106.

FIGS. 4, 4A and 4B also illustrate the spout 108 in the closed position. The combination seal and dispensing spout 108 has been pivoted at hinge pins 148A and 148B to the sealing or closed position in the channel 116 of the cap main body 106. The top wall 128 thereof covers and seals the port or passageway 122 of protruding portion 120 to substantially seal and prevent the flow of material from the interior of the container 104. It can be seen from FIG. 4B that the bottom wall 130 of the spout 108 is preferably in contact with the bottom wall 118 of the cap main body 106 when the spout is in its closed position.

The extended portion 146 of the top wall 128 of spout 106 serves several purposes. First, it minimizes product flow into the space 154 between the protruding portion 120 and the back wall 152 by acting as a barrier to product flowing from protruding portion 120 when the spout 108 is in the open position. Without the extended portion 146, product, especially granulated fertilizer, resting in space 154 may interfere with the pivoting of the spout 108 between its open and closed positions. Second, the extended portion 146 acts as a bridge between the port of protruding portion 120 and the top wall 128 of the spout 106 over which product may traverse as it flows from the port of protruding portion 120 into tube 124. Stated another way, and as shown in FIG. 2A, when the combination seal and dispensing spout 108 is pivoted to its open position, the extended portion 146 of the top wall 128 pivots within the space 154 so as to at least partially rest against a side of the protruding portion 120 of the cap main body 106. In this manner, when the combination seal and dispensing spout 108 is in the open or dispensing position, any material flowing out of the container 104 through the port or passageway 120 is substantially directed into the hollow passageway 136 of the tube 124 and onward to the vanes or baffles 140.

FIG. 5 shows the underside of the dispensing cap 100 with the combination seal and dispensing spout 108 shown in the closed position with respect to the cap main body 106. The protruding portion 120 is coupled to bottom wall 118 and is shown with an entrance way or port leading to passageway 122.

Figure 6:
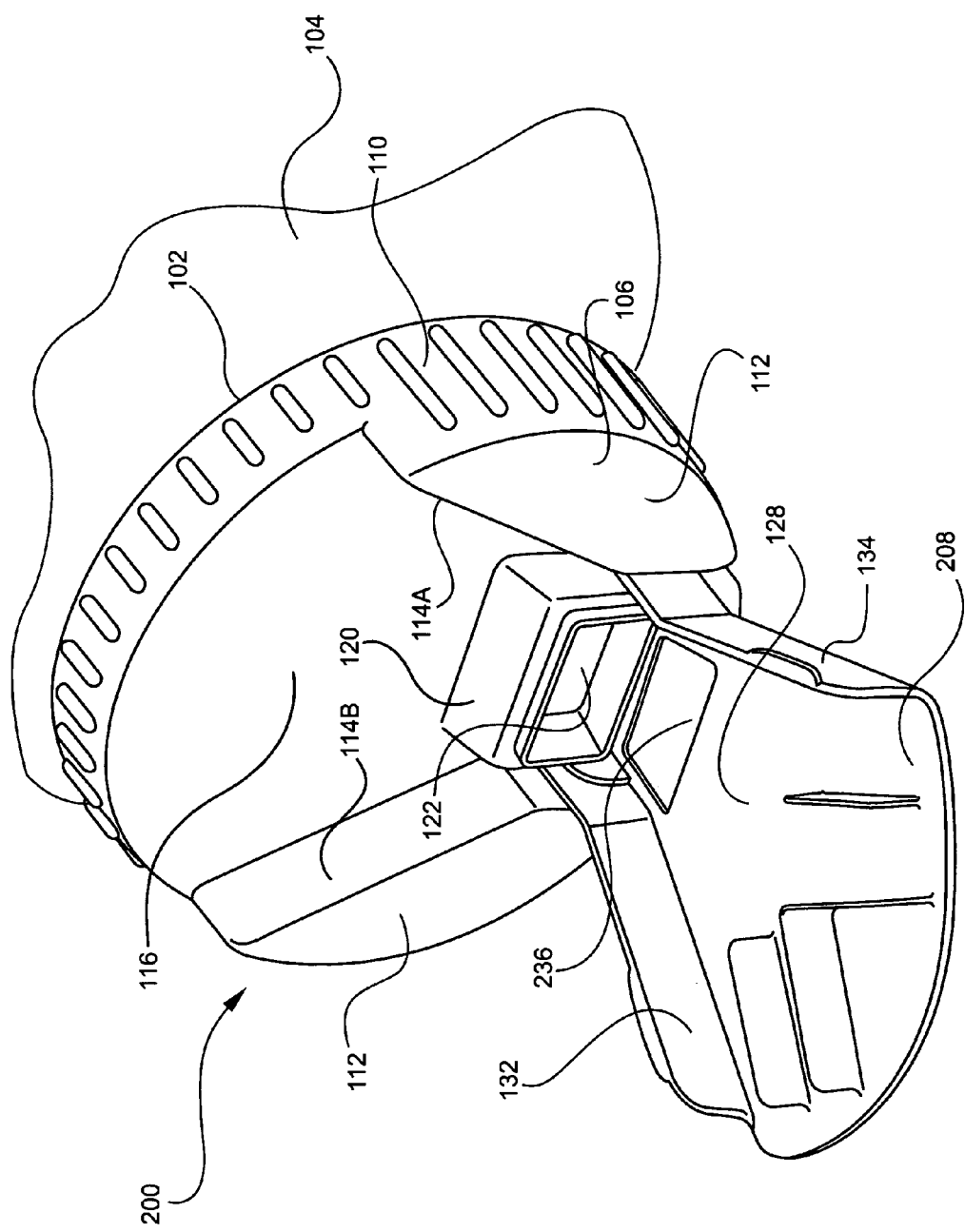
FIG. 6 is a top perspective view of a second embodiment of the dispensing cap formed in accordance with the present invention and shown mounted to the top of a container and with the spout in the open position.

FIG. 6 is a top perspective view of an alternate embodiment of the dispensing cap shown in FIGS. 1 through 5. The cap 200 is mounted to the top of the container 104, and FIG. 6 shows the cap 200 in the open position. This variation is substantially identical to the embodiment described previously with respect to FIGS. 1 through 5, such that only those components which differ from FIGS. 1 through 5 have been identified with different numerical designations. The difference between the cap 100 of FIGS. 1 through 5 and the cap 200 of FIG. 6 is that combination seal and dispensing spout 208 does not include a bottom wall, such as bottom wall 130. Therefore, a passage 236 is formed from top wall 128 and parallel side walls 132 and 134 and which is open on one side when the combination seal and dispensing spout 208 is in the open position. Those skilled in the art recognize that operation of the cap 200 with combination seal and dispensing spout 208 is otherwise identical to the operation of cap 100 with combination seal and dispensing spout 108, as described previously with respect to FIGS. 1-5.

The advantages of the dispensing cap 100, 200 should be evident from the previous detailed description. The cap 100, 200 pivots to preferably a 90° angle with respect to the cap main body 106 when in the open position. This allows the container 104 to be held by the user in a horizontal position by grasping a handle (not shown) formed on a side of the container in order to dispense and spread product from the container. This container position is easier for the user to hold and less tiring when seeding or dispersing fertilizer, for example, than with the container which must be turned upside down and held at its bottom end. Also, the extended portion 146 of the top wall 128 of the dispensing spout 108 helps ensure that all of the product flows from the protruding portion 120 of the cap main body 106 into the tube 124 of spout 108 for dispersal.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A dispensing cap for dispensing material from a container having a mouth, the cap comprising:
   a main body mountable on the mouth of the container, the main body including a protruding portion having a passageway for receiving and passing therethrough material flowing through the mouth, the protruding portion having a plurality of sides, the protruding portion disposed on the main body such that a space is formed adjacent one side of the plurality of sides of the protruding portion; and
   a combination seal and dispensing spout pivotally mounted to the main body, the spout having a top wall and an extended portion joined to the top wall, a bottom wall having an opening formed through the thickness thereof, the opening being dimensioned to receive the protruding portion of the main body, and two side walls coupled to the top wall and the bottom wall, the spout being pivotal between a sealing position in which the protruding portion is received by the opening formed in the bottom wall of the spout with the top wall of the spout resting against the protruding portion of the main body and covering the passageway of the protruding portion such that the spout substantially prevents flow of material through the passageway and a dispensing position in which the top wall of the spout uncovers the passageway of the protruding portion such that material can be dispensed by flowing through the mouth and the passageway and onto the spout, wherein upon the spout pivoting on the main body from the sealing position to the dispensing position, the extended portion pivots through the space and contacts at least one side of the plurality of sides of the protruding portion of the main body.

2. A dispensing cap as defined by claim 1, wherein the bottom wall of the spout is disposed opposite to and in parallel with the top wall, the bottom wall being joined to the two side walls, the top wall, the two side walls and the bottom wall being coupled to one another forming therein a tube having a proximal end with a tube entrance and a distal end with a tube exit, the distal end being enlarged relative to the proximal end, and at least one baffle extending partially radially through a portion of the distal end to enable the flow of material to be directed radially outwardly away from the tube exit.

3. A dispensing cap as defined by claim 1, wherein one of the spout and the main body has at least one hinge pin mounted thereon and the other of the spout and the main body has at least one hinge support mounted thereon, the at least one hinge pin being captively received by the at least one hinge support to enable the spout and the extended portion thereof to pivot with respect to the main body.

4. A dispensing cap as defined by claim 1,
wherein the main body has formed therein a channel, and wherein the spout when in the sealing position is disposed within the channel.

5. A cap as defined by claim 2,
wherein the main body has formed therein a channel, the spout being disposed in the channel when the spout is in the sealing position, and wherein the main body includes at least one locking tab, the at least one locking tab being positioned in the channel for selectively lockingly engaging the at least one baffle when the spout is in the sealing position.

6. A spreader for spreading fluidized material, the spreader comprising:
a container for holding a fluidized material and having a mouth situated at one end thereof through which material can flow; and
a dispensing cap for dispensing material from the container, the cap comprising:
a main body mountable on the mouth of the container, the main body including a protruding portion having a passageway for receiving and passing therethrough material flowing through the mouth, the protruding portion having a plurality of sides, the protruding portion disposed on the main body such that a space is formed adjacent one side of the plurality of sides of the protruding portion; and
a combination seal and dispensing spout pivotally mounted to the main body, the spout having a top wall and an extended portion joined to the top wall, a bottom wall having an opening formed through the thickness thereof, the opening being dimensioned to receive the protruding portion of the main body, and two side walls coupled to the top wall and the bottom wall, the spout being pivotal between a sealing position in which the protruding portion is received by the opening formed in the bottom wall of the spout with the top wall of the spout resting against the protruding portion of the main body and covering the passageway of the protruding portion such that the spout substantially prevents flow of material through the passageway and a dispensing position in which the top wall of the spout uncovers the passageway of the protruding portion such that material can be dispensed by flowing through the mouth and the passageway and onto the spout, wherein upon the spout pivoting on the main body from the sealing position to the dispensing position, the extended portion pivots through the space and contacts at least one side of the plurality of sides of the protruding portion of the main body.

7. A spreader as defined by claim 6, wherein the a bottom wall of the spout is disposed opposite to and in parallel with the top wall, the bottom wall being joined to the two side walls, the top wall, the two side walls and the bottom wall being coupled to one another forming therein a tube having a proximal end with a tube entrance and a distal end with a tube exit, the distal end being enlarged relative to the proximal end, and at least one baffle extending Applicant(s):
partially radially through a portion of the distal end to enable the flow of material to be directed radially outwardly away from the tube exit.

8. A spreader as defined by claim 6,
wherein one of the spout and the main body has at least one hinge pin mounted thereon and the other of the spout and the main body has at least one hinge support mounted thereon, the at least one hinge pin being captively received by the at least one hinge support to enable the spout and the extended portion thereof to pivot with respect to the main body.

9. A spreader as defined by claim 6,
wherein the main body of the dispensing cap has formed therein a channel, and wherein the spout when in the sealing position is disposed within the channel.

10. A spreader as defined by claim 7,
wherein the main body of the dispensing cap has formed therein a channel, the spout of the dispensing cap being disposed in the channel when the spout is in the sealing position, and wherein the main body of the dispensing cap includes at least one locking tab being positioned in the channel for selectively lockingly engaging the at least one baffle when the spout of the dispensing cap is in the sealing position.

\* \* \* \* \*